United States Patent [19]
Mori

[11] Patent Number: 5,187,934
[45] Date of Patent: Feb. 23, 1993

[54] TANDEM TYPE MASTER CYLINDER

[75] Inventor: Kohei Mori, Higashimatsuyama, Japan

[73] Assignee: Jidosha Kiki Co., Ltd., Tokyo, Japan

[21] Appl. No.: 758,882

[22] Filed: Sep. 11, 1991

[30] Foreign Application Priority Data

Sep. 28, 1990 [JP] Japan .................. 2-259382

[51] Int. Cl.⁵ .................. B60T 11/20; F16J 15/18
[52] U.S. Cl. ...................... 60/562; 60/588; 92/165 R
[58] Field of Search ............... 60/562, 585, 586, 588, 60/587; 91/408, 409; 92/75, 151, 166, 168

[56] References Cited

U.S. PATENT DOCUMENTS

| | | | |
|---|---|---|---|
| 3,357,184 | 12/1967 | Hager | 60/562 |
| 3,473,330 | 10/1969 | Fritz | 60/588 |
| 3,618,320 | 11/1971 | Ingram | 60/562 |
| 4,414,811 | 11/1983 | Gaiser | 60/562 X |
| 4,685,300 | 8/1987 | Steer | 60/562 |
| 4,685,301 | 8/1987 | Bacardit et al. | 60/562 |
| 4,887,517 | 12/1989 | Shinohara | 92/168 X |

FOREIGN PATENT DOCUMENTS

| | | |
|---|---|---|
| 81268 | 4/1990 | Japan . |
| 81266 | 6/1990 | Japan . |
| 81267 | 7/1990 | Japan . |
| 81269 | 12/1990 | Japan . |

Primary Examiner—Edward K. Look
Assistant Examiner—John Ryznic
Attorney, Agent, or Firm—McAulay Fisher Nissen Goldberg & Kiel

[57] ABSTRACT

A tandem type master cylinder is disclosed having a housing with a through-bore defining an intermediate portion and opposed end portions. The diameter of each end portion is larger than the diameter of the intermediate portion, and the junctures between the end portions and the intermediate portion define step parts within the housing. Seal assemblies are positioned within the housing at the step junctures formed by the intermediate portion and the end portions and are retained in position by a plug secured within each end portion. Primary and Secondary pistons are disposed for guided movement along the intermediate portion of the housing, and return springs are provided within the housing for urging each piston to its initial rest position.

7 Claims, 4 Drawing Sheets

TANDEM TYPE MASTER CYLINDER

FIELD OF THE INVENTION AND RELATED ART STATEMENT

This invention relates to a tandem type master cylinder.

There are two types of master cylinders. One is the piston type in which a cup packing is mounted on a piston so that the cup packing slides on the cylinder inside surface to passing through an oil passage for cutting off the fluid communication between an oil reservoir and a pressure chamber. The other is the plunger type in which a cup packing is mounted on the inside surface of a cylinder so that a piston slides on the cup packing to let the oil passage on the piston pass through the cup packing for cutting off the fluid communication between an oil reservoir and a pressure chamber.

FIG. 5 shows a conventional tandem type master cylinder of the plunger type.

In this master cylinder 1, a cylinder housing 2 comprises a body 3 and cap 4. The body 3 has an opening 3a at one end, and internal threads 3b are formed on the inside cylindrical surface of the opening 3a. At one end of the cap 4, external threads 4a are formed on the outside cylindrical surface. The cap 4 is secured to the body 3 by engaging the external threads 4a with the internal threads 3b on the body 3.

In the body 3 of this cylinder housing 2, a piston guide 5 and packings 6 and 7 are disposed. A secondary piston 8 is inserted through the piston guide 5. The piston 8, piston guide 5, and packings 6 and 7 provide two pressure chambers 9 and 10 in the cylinder housing 2.

In the cap 4 of this cylinder housing 2, piston guide 11 and packings 12 and 13 are disposed. In addition, a sleeve 14 is disposed throughout the cap 4 and the body 3. A primary piston 15 is inserted through the piston guide 11 and the sleeve 14.

In FIG. 5, reference numerals 16 and 17 denote return springs which apply tensions to the pistons 8 and 15 to the right.

In this master cylinder 1 in the inactive condition, the pressure chamber 9 communicates with an oil reservoir 18 via a passage 8a installed in the piston 8, a passage 5a installed in the piston guide 5, and a passage 2a installed in the cylinder housing 2, whereas the pressure chamber 10 communicates with the oil reservoir 18 via a passage 15a installed in the piston 15, a passage 11a installed in the piston guide 11, a passage 19 formed between the cap 4 and sleeve 14, and a passage 26 installed in the cylinder housing 2.

In the master cylinder of this type shown in FIG. 5, when the primary piston 15 is moved to the left, the communication between the pressure chamber 10 and the oil reservoir 18 is cut off. Subsequently, the pressure in the pressure chamber 10 is increased, which in turn moves the secondary piston 8 to the left, resulting in the cutting off of communication between the pressure chamber 9 and the oil reservoir 18. Subsequently, the pressure in the pressure chamber 9 is increased. As a result, the oil in the pressure chambers 10 and 9 is forced to respective wheel cylinders (not shown) through ports 10a and 9a, respectively.

When the force which is pushing the primary piston 15 to the left is relieved in this condition, the primary piston 15 and the secondary piston 8 are moved to the right by the tension of the return springs 17 and 16. As a result, the oil forced to the wheel cylinders is returned to the pressure chambers 10 and 9. In this process, the pressure in the pressure chambers 10 and 9 may be negative if the pistons 15 and 8 move rapidly. If negative pressure is created, the oil in the oil reservoir goes to between the guide 11 and the packing 12 through the space between the piston guide 11 and sleeve 14, deflects the outer periphery of the packing 12, and enters the pressure chamber 10 through the space between the packing 12 and the sleeve 14. Also, the oil in the oil reservoir 18 goes to between the guide 5 and packing 6 through the space between the piston guide 5 and the body 3, deflects the outer periphery of the packing 6, and enters the pressure chamber 9 through the space between the packing 6 and the body 3. These actions are carried out to prevent air from entering the pressure chambers 10 and 9 because there is a possibility of air entering the pressure chambers from the outside if the pressure in the pressure chambers becomes negative. When the pistons 15 and 8 are returned completely to the right, the passage 15a in the piston 15 connects to the passage 11a in the piston guide 11, and the passage 8a in the piston 8 connects to the passage 5a in the piston guide 5. Thus, the pressure chambers 10 and 9 are in communication with the oil reservoir 18.

In the master cylinder described above, the piston guide 5 and packings 6 and 7 are installed in the body 3 through the opening 3a, and then the sleeve 14, piston guide 11 and packings 12 and 13 are installed together with the cap 4. After that, the piston guides 5 and 11 are put in position via the sleeve 14.

In the above master cylinder 1, the sleeve is made from synthetic resin to reduce the weight and cost.

Because synthetic resins are less rigid than metals, the sleeve 14 expands when the internal pressure in the pressure chamber 10 is high. For this reason, the expansion of sleeve 14 must be allowed for in determining the quantity of oil forced to the wheel cylinders, which causes a volume loss. The above volume loss requires complex control particularly with the use of antilock brake system (ABS).

OBJECT AND SUMMARY OF THE INVENTION

It is therefore an object of this invention to provide a tandem type master cylinder which eliminates the sleeve by the improvement in the means for positioning the piston guides to avoid the volume loss and reduce the weight.

The tandem type master cylinder according to this invention comprises a housing body having a bore which is open to the outside at each end, whose inside diameter at each end is larger than that at the intermediate part; a first plug having a bore at its axial center which is inserted into one end of the bore of the housing body and secured to the end part; a second plug which is inserted into the other end of the bore of the housing body and secured to the end part to close the opening of the end part; a step portion having a bore at its axial center which is formed at the boundary between one end part of housing body and the intermediate part; a seal assembly positioned between the step part and the first plug; a step portion having a bore at its axial center which is formed at the boundary between the other end part of the housing body and the intermediate part; a second seal assembly positioned between the step part and the second plug; a primary piston inserted through the bore of the primary plug, the bore of the first seal assembly, and the intermediate part of the bore of the housing body; a secondary piston inserted through the intermediate part of the bore of the housing body and the bore of the second seal assembly; a first return spring which is interposed between the primary piston and the secondary piston to apply a tension to the primary piston; and a secondary return spring which is interposed between the secondary piston and the secondary plug to apply a tension to the secondary piston.

In this tandem type master cylinder of this invention, the seal assembly at the primary side is installed through one opening of the housing body, and positioned in the housing by one plug for closing the opening. The seal assembly at the secondary side is installed through the other opening of the housing body, and positioned in the housing by the other plug for closing the opening.

Therefore, the tandem type master cylinder of this invention eliminates the need for a sleeve, avoiding the volume loss and reducing the weight.

DETAILED DESCRIPTION OF PREFERRED EMBODIMENTS

Figure 1:
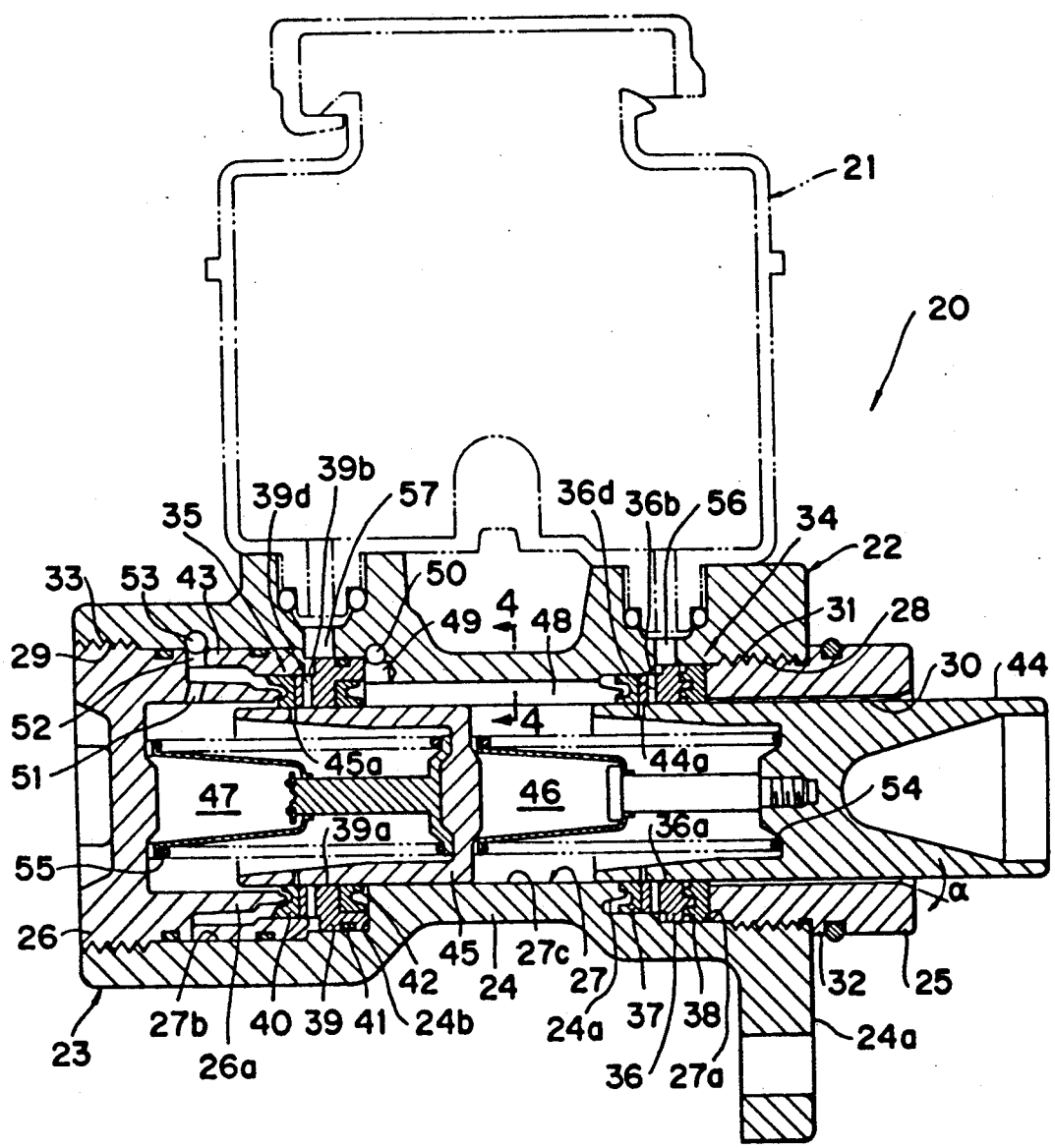
FIG. 1 is a sectional view of the main portion of a tandem type master cylinder according to this invention.

The master cylinder 20 is composed of an oil reservoir 21 and a cylinder portion 22 as shown in FIG. 1. The housing 23 of the housing portion 22 is composed of a housing body 24 and two plugs 25 and 26. The housing body 24 has a bore 27 which is open to the outside at each end. The end parts 27a and 27b of this bore 27 have a larger inside diameter than the intermediate part 27c of the bore. The end parts 27a and 27b have internal threads 28 and 29 formed on the inside surface.

One plug 25 has a bore 30 at its axial center. The rear opening edge of the bore 30 is chamfered at an angle of α. On the outside surface of the tip part of the plug 25, external threads 31 are formed, and a flange 32 is formed adjacently to the rear end of the external threads 31. The tip part of the plug 25 is inserted into the end part 27a of bore 27, and the external threads 31 engage with the internal threads 28 on the end part 27a so that the flange 32 abuts against the end face 24d of the housing body 24. The plug 25 is now secured to the housing body 24.

The other plug 26 has a cylindrical projection 26a at its end. The plug 26 also has external threads 33 on the outside surface at the rear end. The plug 26 is secured to the housing body 24 by inserting the tip of plug 26 into the bore 27b and engaging the external threads 33 with the internal threads 29 on the end part 27b of the bore 27. Thus, the plug 26 closes the opening of the end part 27b of the bore 27.

In the cylinder portion 22, seal assemblies 34 and 35 are interposed between the plugs 25, 26 and the step parts 24a, 24b formed at the boundary between the intermediate parts and the end parts 27a, 27b of the housing body 24.

Figure 2:
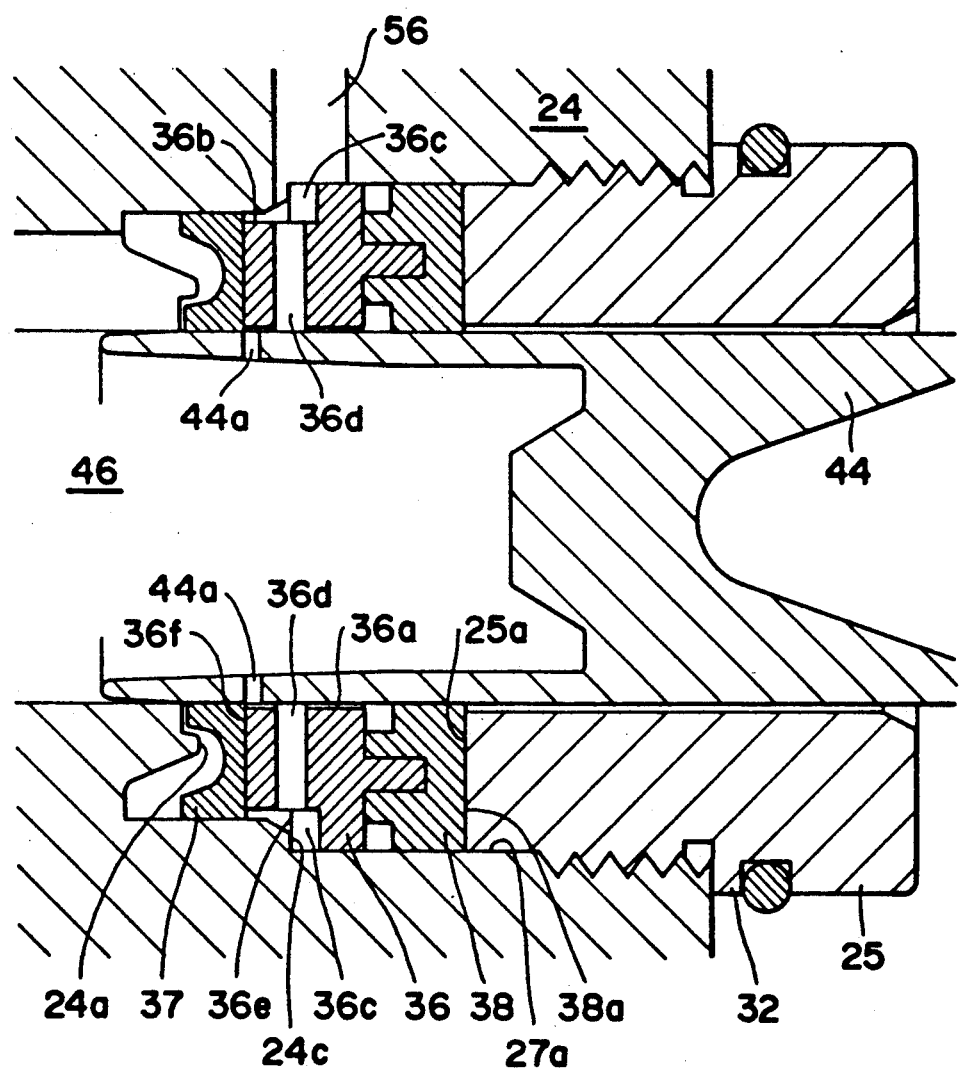
FIG. 2 is an expanded sectional view showing the installation of the first seal assembly of this master cylinder.

The seal assembly 34 comprises a piston guide 36 and packings 37 and 38 which are disposed so that the piston guide 36 is put between them, as shown in the expanded sectional view of FIG. 2.

The piston guide 36a has a piston inserting bore 36 at the axial center. The piston guide also has a notch 36b throughout the periphery at the end, and has a plurality of spot facings 36c at equal intervals throughout the periphery. The bottom face of the spot facing connects continuously to the circumferential surface of the notch 36b. A passage 36d extends through the piston guide 36 from the bottom face of spot facing 36c to the bore 36a.

The seal assembly 34 is forced into the end part 27a through the opening of the end part 27a of the housing body 24, and positioned in the housing 23 by the plug 25 installed in the housing body 24. In this condition shown in FIG. 2, the end face 36e of the notch 36b of the piston guide 36 abuts against the step part 24c formed at the end part 27a of the housing body 24 so that the leftward movement of the guide 36 is restricted, while the end face 38a of the packing 38 abuts against the end face 25a of the plug 25 so that the rightward movement of the packing 38 is restricted. Thus, the piston guide 36 and packing 38 are positioned between the step part 24c of the housing body 24 and the end face 25a of the plug 25. The packing 37 is positioned between the end face 36f of piston guide 36 and the step part 24a of the housing body 24.

Figure 3:
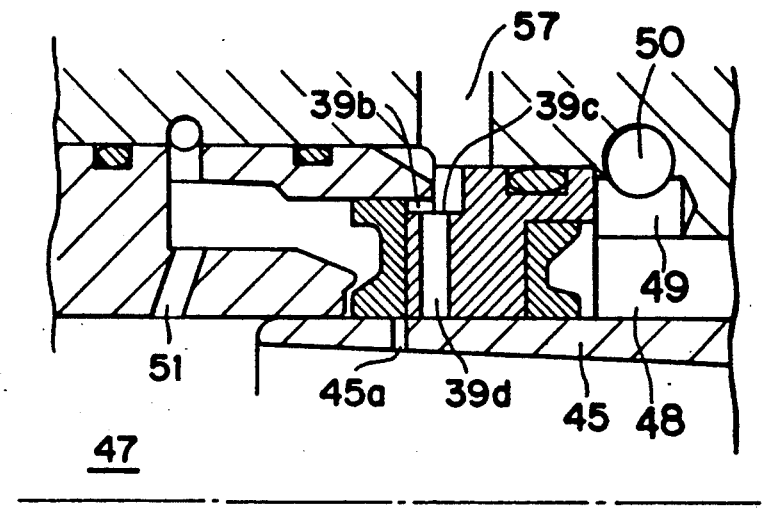
FIG. 3 is an expanded sectional view showing the installation of the second seal assembly of this master cylinder.
Figure 3:
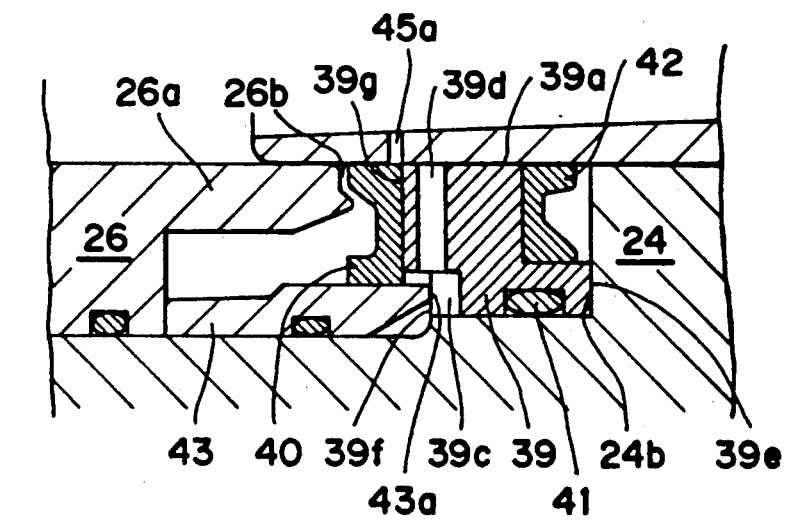

The seal assembly 35 shown in FIG. 3 comprises a piston guide 39, a packing 40 disposed along one surface of the piston guide, a packing 41 disposed circumferentially on another surface of the piston guide, and a packing 42 disposed along another surface of piston guide.

The piston guide 39 has a piston inserting bore 39a at the axial center. The piston guide also has a notch 39b throughout the periphery at the end, and has a plurality of spot facings 39c at equal intervals throughout the periphery. The bottom face of the spot facing connects continuously to the circumferential surface of the notch 39b. A passage 39d extends through the piston guide 39 from the bottom face of spot facing 39c to the bore 39a.

The seal assembly 35 is positioned by pushing the piston guide 39 to which packings 41 and 42 are mounted into the end part 27b through the opening of the end part 27b of the housing body 24, pushing a subcylinder 43 to which packing 40 is mounted on the inner circumferential surface into the end 27b, and securing the plug 26 to the end part 27b. In this condition shown in FIG. 3, the end face 39e of the piston guide 39 abuts against the step part 24b of the housing body 24 so that the rightward movement of the guide 39 is restricted, while the end face 39f of notch 39b of the guide 39 abuts against the end face 43a of the subcylinder 43 so that the leftward movement of the guide 39 is restricted. The packing 40 is positioned between the end face 39g of the piston guide 39 and the end face 26b of projection 26a of the plug 26.

Through the seal assemblies 35 and 34 thus positioned, a secondary piston 45 and a primary piston 44 are inserted as shown in FIG. 1. The seal between the housing body 24 and the primary piston 44 is made by the packings 37 and 38 of the seal assembly 34, and the seal between the housing body 24 and the secondary piston 45 is made by the packings 40, 41 and 42. The primary piston 44 extends through the plug 25 to the outside of the housing 23.

Figure 4:
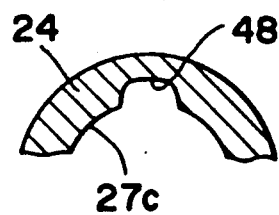
FIG. 4 is a sectional view taken along the plane of line 4—4 in FIG. 1, showing the cross section of a recess.
Figure 5:
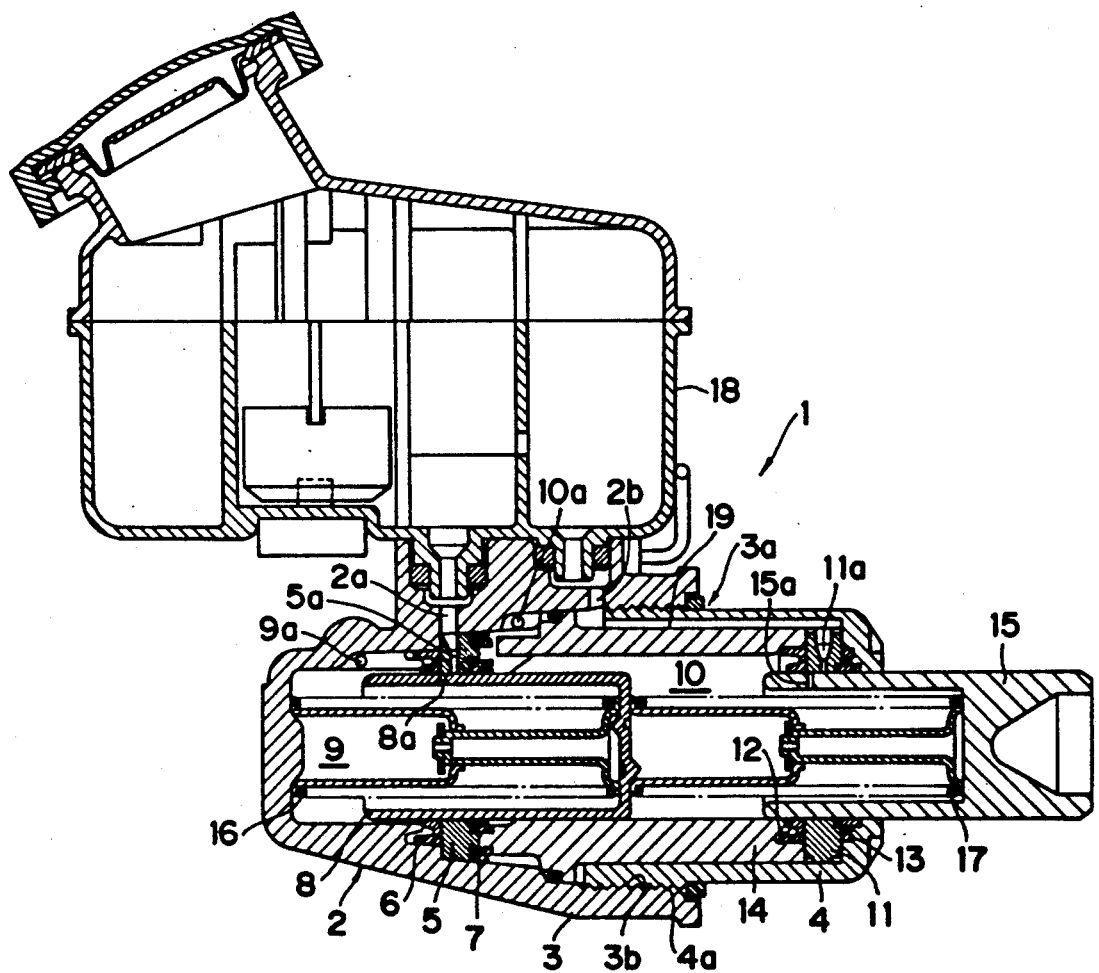
FIG. 5 is a sectional view of a conventional tandem type master cylinder.

The seal assemblies 34 and 35 and pistons 44 and 45 define two pressure chambers 46 and 47 in the housing 23. The inside circumferential surface of the intermediate part 27c of the housing 24 has a recess 48 as shown in FIG. 4. The pressure chamber 46 communicates with a wheel cylinder (not shown) via the recess 48, a notch 49 formed by drilling the step part 24b through the opening of the end part 27b, and a hole 50 drilled in the housing body 24. The pressure chamber 47 communicates to another wheel cylinder (not shown) via a hole 51 drilled in the projection 26a of the plug 26, a notch 52 formed at the rear part of the subcylinder 43, and a hole 53 drilled in the housing body 24.

In the master cylinder 20 of this invention, a return spring 54 is interposed between the pistons 44 and 45, and a return spring 55 is interposed between the piston 45 and the plug 26. The springs 54 and 55 push the pistons 44 and 45 to the right as shown in FIG. 1. In this condition, the pressure chamber 46 communicates with the oil reservoir 21 via a hole 44a drilled in the primary piston 44, the passage 36d in the piston guide 36, the notch 36b, and a hole 56 drilled in the housing body 24, while the pressure chamber 47 communicates with the oil reservoir 21 via a hole 45a drilled in the secondary piston 45, the passage 39d in the piston guide 39, the notch 39b, and a hole 57 drilled in the housing body 24.

In the master cylinder 20 thus arranged, the primary piston 44 fits slidably in the circumferential surface of the bore 36a of the piston guide 36 and the inside circumferential surface of the intermediate part 27c of the housing body 24, and the secondary piston 45 fits slidably in the circumferential surface of the bore 39a of the piston guide 39 and the inside circumferential surface of the internal part 27c of the housing body 24.

Referring to FIG. 1, when the primary piston 44 is moved to the left, the hole 44a in the piston 44 comes to the packing 37, so that the comunication between the pressure chamber 46 and the oil reservoir 21 is cut off. Subsequently, the leftward movement of piston 44 increases the pressure in the pressure chamber 46. Substantially at the same time, the secondary piston 45 is also moved to the left, and the hole 45a of the piston 45 comes to the packing 40, the communication between the pressure chamber 47 and the oil reservoir 21 being also cut off. When the secondary piston 45 is further moved to the left, the pressure in the pressure chamber 47 is also increased. As a result, the oil in the pressure chambers 46 and 47 is directed to the respective wheel cylinders (not shown) which communicate with the pressure chambers 46 and 47, respectively.

When the force which pushes the primary piston 44 to the left is relieved, the primary and secondary pistons 44 and 45 are moved to the right by the tension of the return springs 54 and 55; as a result, the oil which has been sent to the wheel cylinders is returned to the pressure chambers 46 and 47. In this process, the pressure in the pressure chambers 46 and 47 may be negative if the pistons 44 and 45 move rapidly.

If a negative pressure is produced in the pressure chambers 46 and 47, the difference in pressure acting on the both end faces of the packings 37 and 40, particularly on their external peripheries, increases, so that the peripheries of the packings 37 and 40 are deflected toward the pressure chamber 46 and 47. Therefore, the oil in the oil reservoir 21 is supplied to the pressure chamber 46 from the notch 36b of piston guide 36 through the space between the packing 37 and the housing body 24, whereas the oil is supplied to the pressure chamber 47 from the notch 39b of the piston guide 39 through the space between the packing 40 and the subcylinder 43.

In this master cylinder, the inside diameter of the bore 30 of the plug 25 is slightly larger than the outside diameter of the primary piston 44 so that the oscillatory motion of piston 44 is allowed in the plug 25. The circumferential surface at the external end of the bore 30 of the plug 44 has a chamfer of 2 to 15 degrees to prevent the piston 44 in oscillatory motion from being damaged by the corner of plug.

I claim:

1. A tandem type master cylinder comprising:
   a housing having a through-bore defining a first open end portion and a second open end portion interconnected together by an intermediate bore portion, the diameters of said first and second end portions being larger than the diameter of said intermediate portion;
   the juncture between said first end portion and said intermediate portion defining a first step part and the juncture between said second end portion and said intermediate portion defining a second step part;
   a first seal assembly having a through-bore positioned in said first end portion of said housing;
   a second seal assembly having a through-bore positioned in said second end portion of said housing;
   a first plug having a through-bore removably secured within said first end portion of said housing;
   a second plug removably secured within said second end portion of said housing for closing said end portion;
   said first seal assembly being positioned between said first plug and said first step part and said second seal assembly being positioned between said second plug and said second step part;
   a primary piston and a secondary piston each disposed for guided movement from a initial rest position to a displaced position along said intermediate bore portion of said housing;
   said secondary piston being inserted through said first end portion of said housing for movement along said intermediate portion and through the bore of said second seal assembly, said secondary piston adapted to be withdrawn from said housing through the first end portion thereof without removal of said second plug;
   said primary piston also being inserted through said first end portion of said housing and through the bore of said first plug and the bore of said first seal assembly for movement along said intermediate portion;
   a first compression spring interposed between said primary piston and said secondary piston for urging said primary piston to its initial rest position; and
   a second compression spring interposed between said secondary piston and said second plug for urging said secondary piston to its initial rest position.

2. The tandem type master cylinder of claim 1, wherein said first seal assembly and said primary piston define within said housing a first pressure chamber, and wherein said second seal assembly and said secondary piston define within said housing a second pressure chamber, said intermediate bore portion having a recessed groove extending along an inner surface of said portion for the entire length thereof, said groove being in communication with said first pressure chamber, said housing further having a first exit passageway in communication with the groove of said intermediate portion, and said first pressure chamber being in communication with said first exit passageway of said housing via said groove irrespective of the position of said secondary piston.

3. The tandem type master cylinder of claim 2, wherein said intermediate bore portion is formed in a center body portion of said housing, said first exit passageway comprising a notch formed in said center body portion through the second open end portion of said housing and being in communication with the groove of said intermediate bore portion, and said exit passageway further comprising an exit hole formed in said center body portion in communication with said notch.

4. The tandem type master cylinder of claim 2, wherein said intermediate bore portion is formed in a center body portion of said housing, and wherein said first seal assembly comprises a piston guide member having an inwardly disposed end face and an outwardly disposed end face and packing elements disposed along both end faces of said piston guide member, the inwardly disposed end face of said piston guide member being formed with a notch having a surface adapted to engage with a third step part formed in said center body portion of said housing for positioning said first seal assembly in place, said first plug and said first end portion of said housing being formed with complementary engaging threads for securing said plug within said housing end portion, and said first plug having a flange disposed to abut against an outer surface of said first end portion to limit the extent to which said plug projects into said housing end portion to prevent the packing element associated with the outwardly disposed end face of said piston guide member being crushed.

5. The tandem type master cylinder of claim 3, wherein said second seal assembly comprises a piston guide member having an inwardly disposed end face and an outwardly disposed end face and packing elements disposed along both end faces of said piston guide member, said second plug and said second end portion of said housing being formed with complementary engaging threads for securing said plug within said housing end portion, said second plug having a cylindrical portion projecting into said second end portion, the packing element associated with the outwardly disposed end face of said piston guide member and the projecting end of said second plug having interengaging surface portions to prevent said packing element being crushed when said plug is secured in place, said housing further including a cylindrical member positioned within said second end portion and spaced from the cylindrical projecting portion of said second plug to define an internal cylindrical passageway therebetween, the cylindrical projecting portion of said second plug having an opening therein in communication both with said cylindrical passageway and with said second pressure chamber, and said housing further having a second exit passageway in communication with said internal cylindrical passageway, said second pressure chamber being in communication with said second exit passageway of said housing via the opening in said second plug and said internal cylindrical passageway.

6. The tandem type master cylinder of claim 5, wherein said second exit passageway comprises a notch formed in said cylindrical member in communication with said internal cylindrical passageway, said exit passageway further comprising an exit hole formed in said housing in communication with said notch.

7. The tandem type master cylinder of claim 5, wherein said cylindrical member is disposed between said second plug and the piston guide member of said second seal assembly, said cylindrical member having an inner face part in engagement with said piston guide member to locate the inwardly disposed end face of said piston guide member in engagement with a fourth step part formed in said center body portion of said housing for positioning said second seal assembly in place.

* * * * *